No. 725,262. PATENTED APR. 14, 1903.
J. A. LALLEMENT.
FRUIT OR VEGETABLE SLICER.
APPLICATION FILED MAY 13, 1902.
NO MODEL.
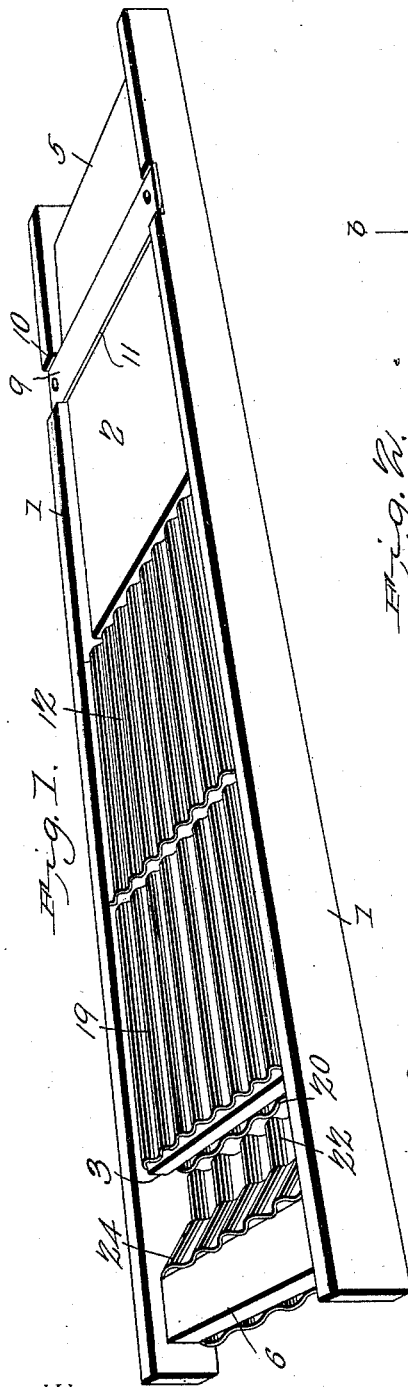
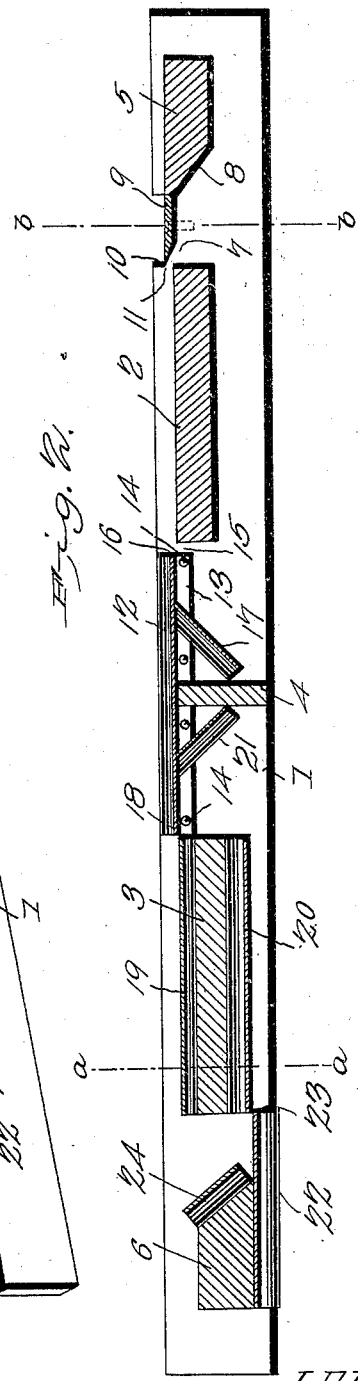
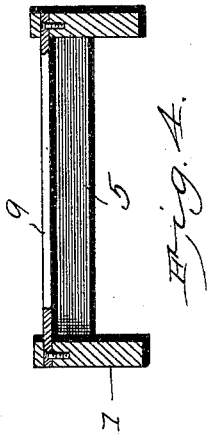
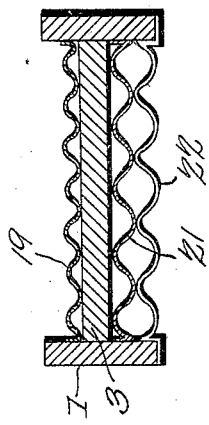
J. A. Lallement, Inventor.
Witnesses
Attorneys

UNITED STATES PATENT OFFICE.

JULIUS A. LALLEMENT, OF ENNIS, TEXAS.

FRUIT OR VEGETABLE SLICER.

SPECIFICATION forming part of Letters Patent No. 725,262, dated April 14, 1903.

Application filed May 13, 1902. Serial No. 107,142. (No model.)

*To all whom it may concern:*

Be it known that I, JULIUS A. LALLEMENT, a citizen of the United States, residing at Ennis, in the county of Ellis and State of Texas, have invented a new and useful Fruit or Vegetable Slicer, of which the following is a specification.

My invention is an improved fruit and vegetable slicer provided with a plurality of cutters and adapted for cutting fruits and vegetables into slices and strips of varying thicknesses and shapes; and it consists in the peculiar construction and combination of devices hereinafter fully set forth and claimed.

In the accompanying drawings, Figure 1 is a perspective view of a fruit and vegetable slicer embodying my improvements. Fig. 2 is a vertical longitudinal sectional view of the same. Fig. 3 is a transverse sectional view of the same, taken on a plane indicated by the line $a\ a$ of Fig. 2. Fig. 4 is a similar view taken on a plane indicated by the line $b\ b$ of Fig. 2.

The side bars 1 of the frame are connected together at points intermediate their ends and at a suitable distance apart by boards 2 3. A cross-bar 4, which is vertically disposed in cross-section, connects the bars 1 together at the centers thereof. Near opposite ends of the bars 1 the same are connected together by cross-bars 5 6. The cross-bar 5 is disposed at a suitable distance from the cross-board 2 to form a throat 7 between them, and the inner edge of said cross-bar 5 is beveled, as at 8. A transversely-disposed cutter-blade 9 extends over the throat 7 and has its ends secured in rabbets 10 in the upper edges of the bars 1. The said cutter-blade is disposed at an inclination with reference to the board 2, and the inner cutting edge 11 of the said blade is disposed at a suitable distance above the said board 2. The latter forms a gage-board on which a potato or other article may be moved longitudinally and across the cutting edge of the blade 9, and it will be understood that said board and said cutter-blade will coact to cut the potato or other article into thin slices with flattened opposite sides, which slices will be discharged through the throat 7 and deflected therefrom by the beveled edge 8 of the cross-bar 5.

At the center of the frame and on the upper side of the cross-bar 4 is a longitudinally-corrugated cutter-plate 12. The sides thereof are downturned, as at 13, bear against the inner sides, and are secured thereto by suitable means, such as nails or screws 14. The said cutter-plate 12 is above the level of the gage-board 2 and is at one end at such distance from the gage-board as to form a throat 15 between them. The said end of the corrugated cutter-plate 12 has a sharpened cutting edge 16. A deflecting-plate 17, which is made of the same kind of corrugated material as that which forms the corrugated cutting-plate 12, is disposed under the latter in an inclined position adjacent the cross-bar 4 and on the side thereof which is opposite the inner end of the gage-board 2. The said cutter-plate 12, in coaction with the gage-board 2, on which the potato or other article is moved longitudinally and across the cutter-plate 12, serves to cut the same into slices, which are corrugated or fluted on opposite sides, the corrugations or flutes of the slices corresponding in size and shape with those of the plate 12, as will be understood. The deflector-plate 17 serves to strengthen that portion of the cutter-plate 12 which is intermediate its cutting edge 16 and the cross-bar 4, and the said deflecting-plate also serves to deflect the corrugated slices as the same pass through the throat 15 and under the plate 12 while being cut from the potato and cause the same to drop from the cutter without being bruised or misshaped. The corrugated cutter-plate 12 has a cutting edge 18, which is opposite its cutting edge 16.

On opposite sides of the cross-board 3 are secured guide-plates 19 20, which are longitudinally corrugated. The corrugations of the plate 19 correspond in size and shape with those of the cutter-plate 12. The said plate 19 is on a lower plane than the plate 12, and the adjacent ends of said plates are so arranged with respect to each other as to form throats or openings between them, through which strips cut from a potato or other article moved and guided on the gage-plate 19 and across the cutting edge 18 of the plate 12 will pass. The bottoms of the grooves of the cutting-plate 12 are in line and on a level with the tops of the ribs or corrugations of the gage or guide plate 19. Hence the slices cut from the fruit or vegetable by the coaction of the cutter-plate 12 and the gage or guide plate 19 will correspond in cross-section to that of the openings or throats between the ends of said plates, as will be understood. Under the plate 12 and on the side of the cross-bar 4 opposite the board 3 is a corrugated deflecting-plate 21, which is similar in construction to that of the cutter-plate 17.

It will be understood from the foregoing that the corrugated cutter-plate 12 may be used in coaction with either the plain-faced gage 2 or the corrugated gage or guide plate 19 to cut a vegetable or other article either into strips or into slices which are corrugated on opposite sides.

The corrugations of the plate 20 are different in size and may also be of different shape from those of the plate 19. The said plate 20 also is a guide or gage plate, and the same coacts with a cutter-plate 22, which is secured across the bar 6 and to the side bars 1. The said cutter-plate 22 has corrugations which correspond in size and shape with those of the plate 20, and the said plates 20 22 are so related to each other as to cause the potato or other article moved on the plate 20 and across the cutting edge 23 of plate 22 to be cut into strips of a shape in cross-section corresponding to that of the openings or throats between the ends of said plates 20 22. It will be understood that when the said plates 20 22 are brought into requisition the cutter will be disposed in the reverse position from that shown in Figs. 1 and 2, so that said plates 20 22 will be on the upper side of the frame. A deflecting-plate 24, which is corrugated and corresponds in cross-section with the cutter-plate 22, is disposed on the under side of the latter and secured to the cross-bar 6. The strips cut by the coaction of the plates 20 22 may be of either greater or less diameter than those cut by the plates 12 19, according to the size and shape of the corrugations of said respective plates.

It will be understood that my improved vegetable and fruit slicer is adapted to cut vegetables and fruit into slices and strips of various thicknesses and shapes and that the same requires no skill in the person using it.

My improved slicer is exceedingly simple in construction, is strong and durable, and may be manufactured at small cost.

Having thus described my invention, I claim—

1. A fruit and vegetable slicer having longitudinal corrugated plates disposed one beyond the other and in different planes, the higher plate having a cutting edge at the inner end thereof and a corrugated inclined deflector on its under side the corrugations of the said plates being matched and said corrugated inclined deflector being disposed at an angle to the higher plate, substantially as described.

2. A fruit and vegetable slicer having a longitudinally-corrugated cutter-plate with cutting edges at its opposite ends, a corrugated gage element at one end thereof and so disposed with reference thereto that the bottoms of the grooves in said cutter-plate are in line and on a level with the tops of the corrugations of said gage element, a plain gage-board at the opposite end of and in a lower plane than said corrugated cutter-plate, a cutter above said plain gage-board at the end thereof opposite said corrugated cutter-plate, and oppositely-inclined corrugated deflectors under said corrugated cutter-plate, intermediate its ends, substantially as described.

In testimony that I claim the foregoing as my own I have hereto affixed my signature in the presence of two witnesses.

JULIUS A. LALLEMENT.

Witnesses:
JAMES J. HODIE,
E. R. OSBORN.